ADAM SPANIER.
Hay-Press,
No. 118,164.
Patented August 15, 1871.
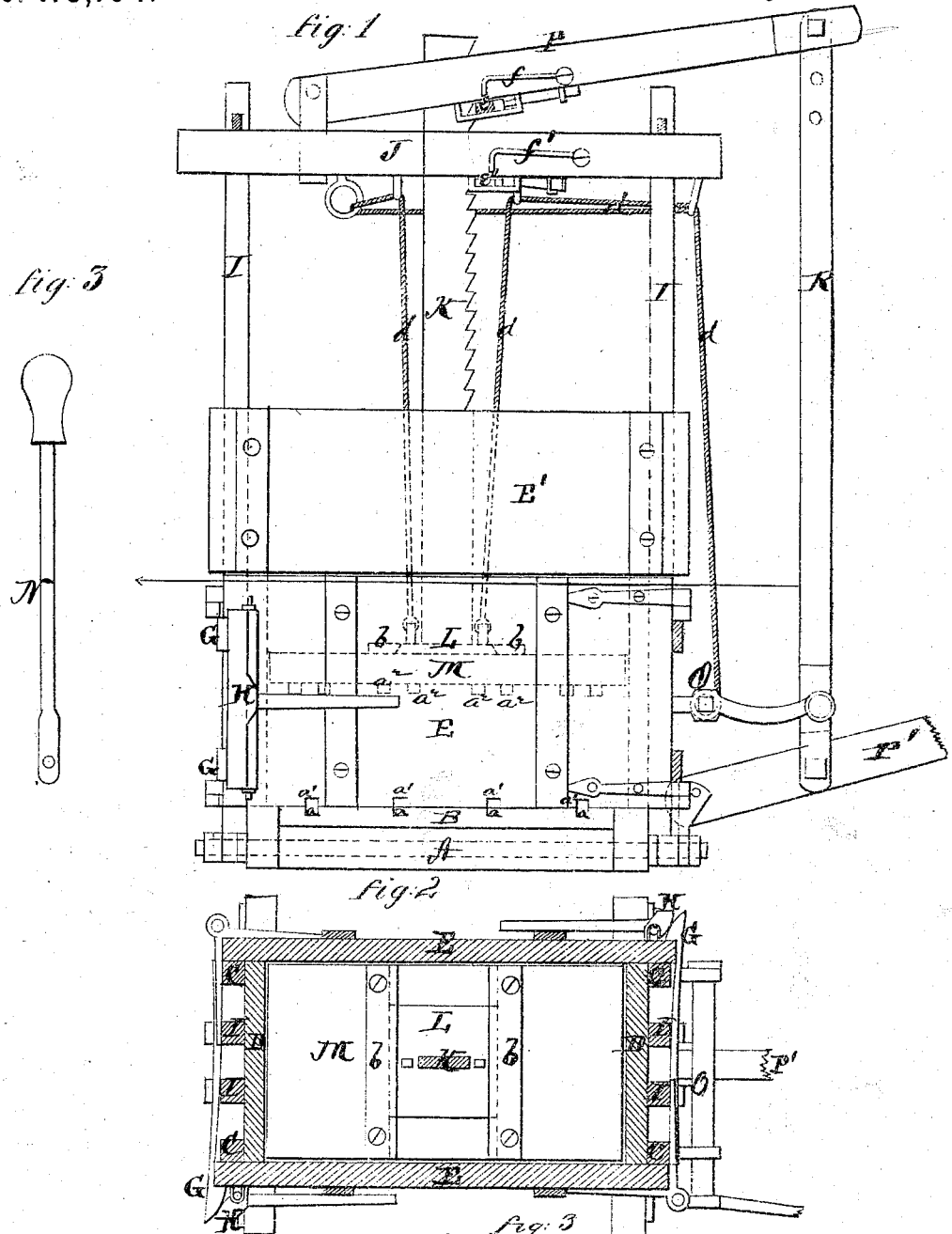

UNITED STATES PATENT OFFICE.

ADAM SPANIER, OF ST. JOHN, INDIANA.

IMPROVEMENT IN HAY-PRESSES.

Specification forming part of Letters Patent No. 118,164, dated August 15, 1871.

*To all whom it may concern:*

Be it known that I, ADAM SPANIER, of St. John, in the county of Lake and in the State of Indiana, have invented certain new and useful Improvements in Hay-Presses; and do hereby declare that the following is a full, clear, and exact description thereof, reference being had to the accompanying drawing and to the letters of reference marked thereon making a part of this specification.

The nature of my invention consists in the construction and arrangement of a hay and cotton-press, as will be hereinafter more fully set forth.

In order to enable others skilled in the art to which my invention appertains to make and use the same, I will now proceed to describe its con- construction and operation, referring to the annexed drawing, in which—

Figure 1 is a side elevation of my press. Fig. 2 is a horizontal section of the same. Fig. 3 is a view of one of the spring-pawls used in forcing down the follower, and Fig. 4 is a side view of a tool used in tying the bale after it has been pressed.

A represents a frame or bed of suitable construction, upon which is secured the bottom B of the bale-box. This bottom is, on its upper side, provided with grooves $a\ a$ running transversely across the same to receive the ropes with which the bale is to be tied. To the frame or bed A are secured four corner-posts, C C, which support the end pieces D D of the box. The sides of the bale-box are each formed of a door, E, and stationary board E' above said door. The door is hinged at one end, and locked at the other by means of spring-catches G G. At the outer end of each door is pivoted a vertical eccentric bar or lever, H, provided with a suitable handle, by the use of which the spring-catches G G may be forced away from the edge of the door and the door opened. At or rather in the lower edge of each door is a series of square notches, $a^1\ a^1$, corresponding with the grooves $a\ a$ in the bottom B, as shown in Fig. 1. Between the corner posts C C, at each end of the press, are two upright standards, I I, to which the end-pieces D D are also secured. The four standards I I are connected by means of a cross-bar, J, through the center of which passes a bar, K, toothed or notched on one side, as shown in Fig. 1. To the lower end of this bar is secured a horizontal plate, L, two edges of which are beveled so as to slide under beveled cross-bars or guides $b\ b$ on the upper side of the follower M. By this means, when the follower is raised above the bale-box, it may be drawn to one side, thereby facilitating the filling of the box. On the under side of the follower M are ribs or cleats $a^2\ a^2$, to form grooves corresponding with the grooves $a\ a$ in the bottom B.

After the bale has been pressed, the grooves formed of said cleats $a^2$ admit of the passage of the tool N, shown in Fig. 4, whereby the cord or rope for tying may be drawn over the bale.

The follower is raised by means of ropes $d\ d$ attached to the plate L, and, passing over suitable pulleys and rings, connect with a windlass, O. It is brought down to press the bale by the following-means: Near one end of the cross-bar J is hinged or pivoted a lever, P, provided with a suitable mortise, through which the toothed or notched bar K passes. On the under side of this lever P is a spring-pawl, $e$, which engages with the teeth on the bar K, so that when the lever is brought down the bar and follower are also forced downward. On the under side of the cross-bar J is a similar spring-pawl, $e'$, for holding the bar and follower down while the lever P rises to cause the pawl $e$ to take a fresh hold. The outer end of the lever P is, by a pivoted bar, R, connected with a lever, P', near its inner end, said lever P' being hinged or pivoted in the bed A, as shown. By this means I obtain a double lever-power for pressing the bale. While the follower is being raised the pawls $e\ e'$ are held away from the bar K by hooks $f\ f'$.

Having thus fully described my invention, what I claim as new, and desire to secure by Letters Patent, is—

1. The follower M, with beveled guides $b\ b$, sliding upon the plate L, substantially as and for the purposes herein set forth.

2. The combination of the levers P P', connecting-bar R, pawls $e\ e'$, ratchet or toothed bar K, and follower M, all constructed and arranged to operate substantially as and for the purposes herein set forth.

In testimony that I claim the foregoing I have hereunto set my hand this 17th day of June, 1871.

ADAM SPANIER.

Witnesses:
EDWARD MAIR,
I. P. NOLL.